United States Patent [19]

Sullivan et al.

[11] Patent Number: 5,067,828
[45] Date of Patent: Nov. 26, 1991

[54] TRANSFERRED ELECTRON EFFECTIVE MASS MODULATOR

[75] Inventors: Gerard J. Sullivan, Thousand Oaks; Kenneth D. Pedrotti, Moorpark; Herbert Kroemer, Santa Barbara, all of Calif.

[73] Assignee: Rockwell International Corporation, El Segundo, Calif.

[21] Appl. No.: 565,292

[22] Filed: Aug. 9, 1990

[51] Int. Cl.$^5$ .............................................. G02B 6/10
[52] U.S. Cl. ............................................ 385/3; 385/4
[58] Field of Search .................. 350/96.11–96.14, 350/353, 355; 357/4, 16

[56] References Cited

U.S. PATENT DOCUMENTS

| | | | |
|---|---|---|---|
| 4,840,446 | 6/1989 | Nakamura et al. | 350/96.14 X |
| 4,904,045 | 2/1990 | Alferness et al. | 350/96.19 |
| 4,923,264 | 5/1990 | Langer et al. | 350/355 X |
| 4,943,133 | 7/1990 | Deri et al. | 350/96.14 |

Primary Examiner—Akm Ullah
Attorney, Agent, or Firm—John J. Deinken

[57] ABSTRACT

An optical modulator having a waveguide region comprising first and second layers of material having differing effective masses for free charge carriers at a predefined band edge energy disposed immediately adjacent to each other and covered by a lower refractive index cladding. A preferred embodiment employs a semiconductor system such as $Al_yGa_{1-y}As$ for the first and second material layers with the value of y adjusted between the layers so that the conduction band edge energies of the direct band in one layer is about the same as that of the indirect condition band in the other layer. A mechanism is provided for moving charge carriers between the first and second layers, such as metal contacts and a power source for applying electrical fields to the waveguide structure in a desired modulation pattern. The material layers may be deposited as a series of quantum wells with limited disordering or a ridge structure used to obtain lateral confinement. In addition, the optical modulator can comprise a photodetector or a second control waveguide positioned adjacent to the waveguide region and electrically connected to the waveguide to alter electrical fields applied to the waveguide in response to optical signals.

18 Claims, 8 Drawing Sheets

TRANSFERRED ELECTRON EFFECTIVE MASS MODULATOR

FIELD OF THE INVENTION

The present invention relates to modulation of optical wavelength electro-magnetic radiation and more particularly to a high-speed, low-loss, phase modulator for optical wavelength radiation. The invention further relates to an optical modulator having a waveguide region comprising at least two materials with different free carrier mobility positioned adjacent to each other, and apparatus for moving free carriers between the materials.

BACKGROUND OF THE RELATED ART

The application of lasers and fiber optics to communications and high speed data transfer has created a need for high speed optical modulators to take advantage of the wide bandwidth available at optical frequencies. Optical modulators such as Mach-Zender interferometers are needed to implement coherent PSK or FSK modulation in long haul optical fiber transmission systems. Directional couplers and switches are also needed for optical switching, multiplexing, and high speed signal processing, such as in analog to digital conversion. There are also a growing number of non-communication applications for high speed optical modulators, such as high speed optical based image or data processing, or logic.

Several types of modulators have been developed using electro-optic crystals, electro-absorptive materials, and materials with an electrically alterable index of refraction. Recent development efforts have generally been directed to providing reduced modulator size, increased modulation efficiency, and increased speed.

A common type of optical modulator is a phase modulator made from $LiNbO_3$ electro-optic material. At high frequencies, the r33 component of an electro-optic tensor in a $LiNbO_3$ crystal structure is very large, typically on the order of $3.08 \times 10^{-9}$ cm/Volt. Using this effect and known relationships between applied voltages along the Z crystal axis, crystal dimensions, and modulator configuration, the index of refraction for an extraordinary ray polarized along the Z direction can be altered by changing the magnitude of an electric field applied across the crystal.

In order to obtain complete intensity modulation and a very efficient design, the light must have its phase shifted by a factor of $\pi$. The product of the length of the modulation path and the applied drive voltage required for a $\pi$ phase shift represents a figure of merit for classifying such devices. A second figure of merit for such devices is the ratio of required drive voltage and device bandwidth. For $LiNbO_3$, this value is typically optimized to 1.5-2.4 Volts per Gigahertz at 1.3 $\mu$m wavelength and 2.5 GHz. However, implementation of electro-optical phase modulators requires very high geometric precision. At the same time, modulator configurations must be cautiously designed and adjusted to avoid stray capacitances and parasitic resistances which degrade speed and switching performance. The requirements for precision and optimization increase manufacturing complexity and cost while decreasing reproducibility.

As an alternative, it has been shown that higher bandwidths can be achieved using traveling-wave type modulators where the necessary drive voltage decreases with increasing length. One of the best reported traveling-wave modulators has a bandwidth of 11.2 GHz, a length of 0.6 cm, and a drive voltage of 8.8 volts. The bandwidth product of 6.7 GHz-cm is close to a 9 GHz-cm theoretical maximum for the material. While this type of modulator can achieve high modulation rates, inherent propagation delays due to the longer length make it unsuitable for optical logic.

Direct modulation of optical intensity is also accomplished using the electro-absorption effect in semiconductors. In this technique, the energy level of the band edge in an optical transmission material is decreased by an increase in an applied electric field. This makes it possible to affect modulation when optical radiation being transferred through the modulator is tuned in frequency near the band edge. The electro-absorptive effect has also been implemented using multiple quantum well material and Self-Electro-optic-Effect Devices (SEED). However, because these devices run near the band edge, they are very sensitive to both wavelength and temperature variations. Small shifts in either parameter have a large impact on the transfer or modulation of radiation which quickly degrades performance. Switching times for electro-absorption devices also tend to be very slow for the applications of interest.

Another technique is to use the effects of free carriers on waveguide transmission properties. A group of charged carriers are introduced from outside of a waveguide region to alter the index of refraction of the material forming the waveguide region. This can be done by applying an electric field to a material adjacent to the waveguide to move charged carriers, such as electrons, into the waveguide region. However, introduction of charge carriers is generally a slow process requiring carrier transfer over substantial distances on the device scale. There are inherent problems with switching speed resulting from maximum carrier velocity or rate of diffusion within a material structure and subsequent recombination outside of the waveguide region. Therefore, no matter how fast the carrier transfer is driven, inherent time delays set a limit on the resolution or response time of the modulator. At the same time, the threshold for carrier or electron motion also sets a loss in terms of energy extracted from an optical signal.

What is needed then is a new method of operation or apparatus for modulating optical signals which reduces signal loss and operates at high speeds. The apparatus needs to be implemented with minimal complexity and precision constraints. It is also desirable to minimize driving voltage and device capacitance while matching low impedance input sources. Any new device should be highly compatible with advanced laser and Multiple Quantum Well (MQW) devices.

SUMMARY

With the above problems in the art in mind, it is one purpose of the present invention to provide an optical modulator capable of operation at very high speeds.

One advantage of the present invention is that it modulates optical signals using low power and with very low loss.

It is another purpose of the invention to provide a high-speed, low-loss, phase modulator capable of operating in the 1.3 $\mu$m-1.5 $\mu$m wavelength region.

Other advantages of the invention are extremely fast speed limited only by RC time constants, and operation over a wide optical frequency range.

Another purpose of the invention is to provide an optical modulator capable of being driven by optical control sources.

Yet another advantage of the invention is the ability to be integrated with a variety of optical devices, especially those employing multiple quantum well structures.

These and other purposes, objects, and advantages are achieved in an optical modulator having a waveguide region comprising an alterable index of refraction material, adjustable over a predefined range, which is generally covered by a lower refractive index cladding. The alterable index material comprises first and second layers of material having first and second effective masses, respectively, for free charge carriers at a predefined band edge energy disposed immediately adjacent to each other. The waveguide region further comprises charge carrier barrier material disposed adjacent to and outside of the first and second layers to provide or enhance charge confinement within the waveguide region. In some applications the barrier material can operate as an optical cladding layer.

In operation, the phase of optical radiation traversing the optical waveguide is altered or modulated by applying a voltage across the waveguide structure to move charge carriers between the first and second materials in response to a desired modulation pattern. The change in free carrier location changes the free carrier effective mass and, therefore, the index of refraction of the waveguide.

The means for applying a voltage or electric field generally comprises at least two electrical contacts or contact layers disposed on opposite sides of the waveguide region and connected to an electrical power source. In some applications, the waveguide cladding can be electrically conductive and configured to act as the appropriate contacts.

A preferred optical modulator embodiment employs high carrier mobility $Al_yGa_{1-y}As$ for the first and second effective mass materials. The value of y is adjusted so that the band edge energy of the direct band, $\Gamma$ band, in one material layer or channel is about the same as the band edge energy of the indirect band, X band, in the second material layer or channel. In this embodiment, the charge carriers comprise electrons.

The optical modulator is generally manufactured in the form of a planar waveguide structure with the first and second optically transmissive materials, barrier material, and cladding deposited as planar layers. Lateral confinement can be provided by applying the upper cladding layer in the configuration of a ridge. Biasing contacts are disposed on upper and lower surfaces of the modulator, unless the cladding acts as conductive contacts.

An improved embodiment results from depositing the first and second optically transmissive materials as a series of quantum well layers. The quantum well materials can be deposited as a superlattice structure having a graded profile. To achieve lateral or horizontal confinement, portions of the quantum well layers are disordered by application of material doping on opposite sides of a desired optical path.

In an alternate embodiment, the optical modulator further comprises a photodetector positioned adjacent to the waveguide region. The photodetector has an electrical output connected to a contact that is used to apply a voltage across the waveguide. The photodetector is generally connected to a power source for biasing. This embodiment can be manufactured on a substrate as a separate layer of material or as a lower index cladding.

In other embodiments, the optical radiation modulator further comprises a second waveguide disposed adjacent to the waveguide region. This is generally accomplished by disposing electro-absorptive material between the low index cladding and one bias contact for the modulated waveguide. An optical control waveguide is formed in the electro-absorptive material. Optical signals in the control waveguide are used to alter or modulate the electrical conductivity of the electro-absorptive material. Changes in electrical conductivity of the electro-absorptive material alters the voltage applied across the modulator waveguide, in turn altering the position of free charge carriers.

BRIEF DESCRIPTION OF THE DRAWINGS

The novel features of the present invention may be better understood from the following description when taken in conjunction with the accompanying drawings in which like characters refer to like parts and in which.

DETAILED DESCRIPTION OF PREFERRED EMBODIMENTS

The present invention provides a new optical modulator that is capable of very high-speed, low-loss operation. The invention uses multiple layers of material having different charged carrier mobilities to form a waveguide region surrounded by cladding. This structure allows very high speed alteration of the effective mass of the free carriers in the waveguide region through application of an electric field across the waveguide. Modulation of the applied electric field results in modulation of the index of refraction and, therefore, of optical signals in the waveguide.

The preferred embodiment of the present invention is described below utilizing a multilayered semiconductor structure comprising a $GaAs$-$Ga_yAl_{1-y}As$ system. The direct and indirect conduction bands are well understood for this system and have been shown to be useful in implementing the invention. However, it will be readily apparent to those skilled in the art that other systems can be employed within the teachings of the invention.

Figure 1:
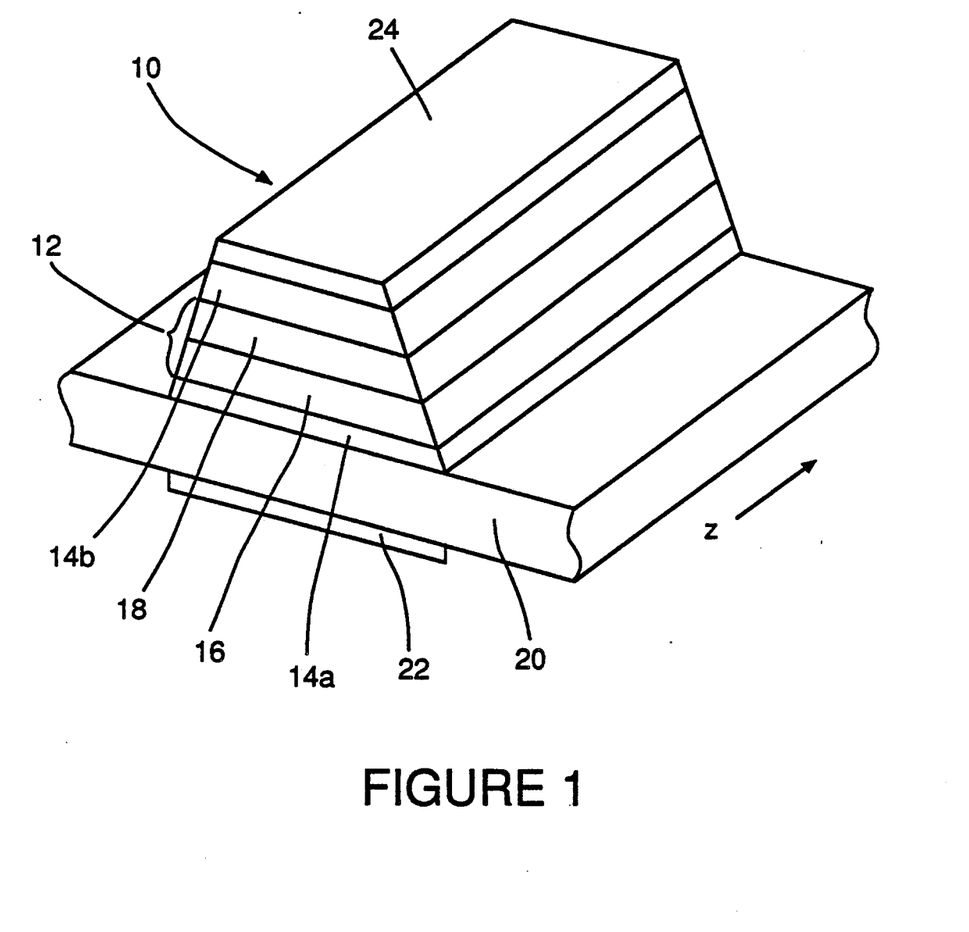
FIG. 1 illustrates a perspective view of a high speed optical modulator constructed according to the principles of the present invention with one end sectioned.

An optical modulator constructed according to the principles of the invention is illustrated in the perspective view of FIG. 1. In FIG. 1, an optical modulator 10 uses a waveguide region 12 disposed between two cladding layers 14. To provide the required optical confinement, the material comprising the cladding layers 14 has a lower index of refraction than the material forming the waveguide region 12. With the indices of refraction being appropriately adjusted, optical radiation introduced into the region 12 is substantially confined within the region 12 and transferred along the modulator longitudinal axis (Z).

In order to affect the transfer of optical radiation through the modulator 10, the index of refraction of the material forming the waveguide region 12 is altered. One method of accomplishing this change is to introduce charge carriers, such as electrons, into the waveguide region or material 12.

The variation in refractive index, $\Delta n$, with carrier density in semiconductors below the bandgap is given by the expression:

$$\Delta n = -\frac{e^2\lambda^2}{8\pi^2 n\epsilon_o C^2}\left(\frac{1}{m_e^*} + \frac{1}{m_h^*}\right)\Delta N \quad 1)$$

where $\Delta N$ is the change in carrier density, n is the refractive index, and $m_i^*$ is the effective mass of the charge carriers. In equation 1, $m_e^*$ is the effective mass of electrons, and $m_h^*$ is the effective mass of holes. The possible change in refractive index, $\Delta n$, can be quite large and is caused by interaction of the electro-magnetic waves propagating through the optical medium with the plasma of the free carriers.

The phase shift obtained for a modulator of length L is then given by the relationship:

$$\Delta\phi = \frac{2\pi\Delta nL}{\lambda_{vac}} \quad 2)$$

The phase of light must be shifted by $\pi$ to achieve complete intensity modulation which is desired for high efficiency modulators. It is understood that the actual performance of such a modulator depends on details of device construction which effect mode overlap and electrode spacing. Good modulator designs provide for a low voltage drive and an operating bandwidth which is high but decreases with decreasing device length. The bandwidth is typically viewed as being RC time constant limited by the driver resistance and modulator capacitance. Electrical transit time for charge carriers also limits speed at higher frequencies as does the delay in time for the modulation voltage to propagate along the modulator electrodes as they increase in length.

In previous modulator designs, free charge carriers were moved into and out of a waveguide region (12) containing the electro-magnetic mode. Unfortunately, introduction and removal of charge carriers is generally a slow process depending upon transfer over substantial distances from adjacent material which slows down modulator operation. In the present invention, transport delay and other problems with previous techniques are solved by making free carriers available within the waveguide region 12, that is, providing the free carriers as a part of the waveguide material structure. The present invention reduces distance and time problems by moving free carriers over very short distances between sub-regions of high and low effective mass within the waveguide region.

The present invention alters the index of refraction of the waveguide region 12 by utilizing two material layers 16 and 18 within the waveguide region and using the transfer of charge carriers between these layers to alter their effective masses. The change in effective mass results in a change in the effect the carriers have on the index of refraction which affects the refractive index of the waveguide region 12. The carriers are easily moved by an electric field applied across low and high carrier mobility regions, 16 and 18, of the waveguide. The materials forming the waveguide sub-regions 16 and 18 have different conduction band minimums, with approximately the same band edge energies.

An example of the impact of the proposed method on optical radiation in the waveguide region 12 can be seen using $5\times10^{18}$ electrons per cubic centimeter as free charge carriers in a GaAs system. If these carriers are moved in and out of the waveguide region 12, then index changes on the order of 0.02 occur, which is larger than that obtained using the electro-optic effect in semiconductors.

Figure 2:
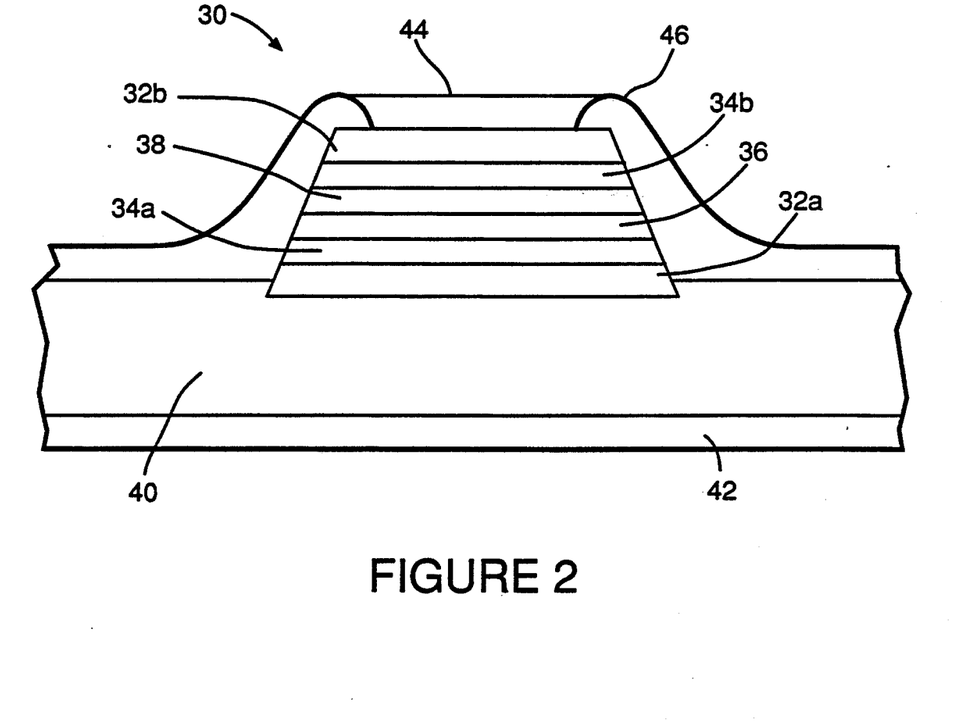
FIG. 2 illustrates a sectional view of a barrier enhanced or doped configuration for the high speed optical modulator of FIG. 1 with improved confinement.

An exemplary embodiment useful to implement the method of the present invention is illustrated in the cross-sectional view of FIG. 2. As seen in FIG. 2, an optical modulator 30 uses a support substrate 40 to support several layers of material used to form an optical waveguide. An ohmic contact 42 is deposited on the lower surface of the substrate 40 to provide one of two electrical contacts needed to apply an electric field for moving the free carriers.

The waveguide for the optical modulator 30 comprises a lower cladding layer 32a positioned on the substrate 40 followed by a layer of high effective mass material 36 also labeled X well material, a layer of low effective mass material 38 also labeled $\Gamma$ well material, and an upper cladding layer 32b. An ohmic contact 44 is generally applied to the top cladding layer 32b. If the material layers 32, 34, 36, and 38 are etched or processed to provide a raised waveguide structure, it is typically covered by an insulating material 46. Barrier layers 34a and 34b are disposed between the cladding layers 32 and the X and $\Gamma$ materials, 36 and 38, to provide charge carrier confinement.

Deep donors can create temperature and illumination dependence of the number of carriers which may be useful for some applications. However, where this dependence is undesirable, the aluminum content of material layers containing a dopant can be decreased immediately adjacent to the $\Gamma$ and X wells (y=0.25) to keep donors shallow. Such layers can be very thin, in the range of 20–40 nanometers, and will not affect overall device performance.

N-type doped, high aluminum content AlGaAs layers are known to exhibit photo-ionization of deep donor levels. This effect could provide a strong optical nonlinearity and result in a power dependent index of refraction caused by collection of photo-generated carriers in the $\Gamma$ and/or X channels. A combination of the present invention with a Fabry-Perot cavity could result in an optically bi-stable device.

Figure 3:
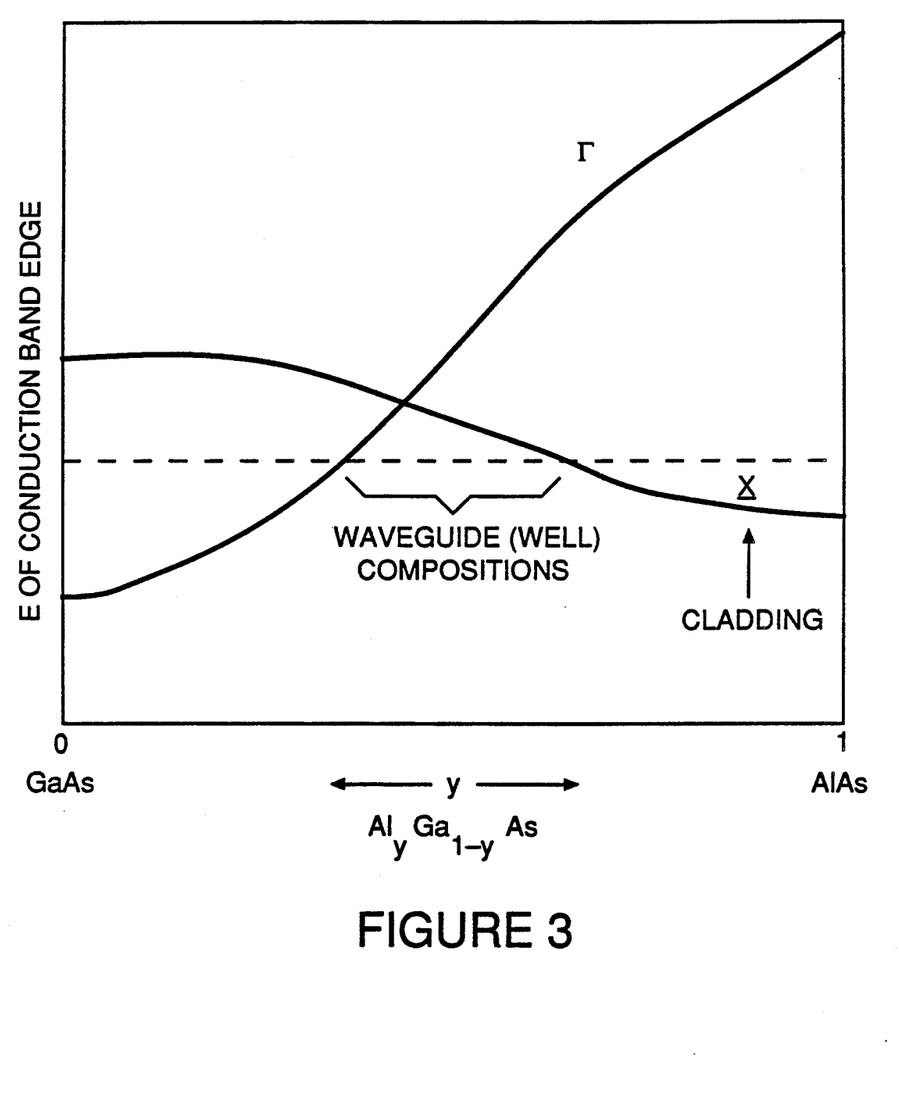
FIG. 3 provides a graphical representation of the effect of material concentrations found useful for manufacturing the device of FIG. 1 on band edge energies.

AlGaAs has many conduction bands with corresponding minimum (ranging up to a maximum) electron energy states. Two well known conduction band minimums are the direct and indirect, or $\Gamma$ and $X$ conduction bands as they are commonly called. The conduction band minimum or band edge energy for these bands changes with changing concentrations of the aluminum and gallium. This is illustrated in the graphical representation of FIG. 3. In FIG. 3, a relative change in band edge energy is shown for each type of conduction band minimum as the concentration of aluminum and gallium is changed. As the amount of aluminum content increases, from 0 to 1, and gallium content decreases, from 1 to 0, the conduction minimum for the $\Gamma$ band increases while that for the $X$ band decreases.

It has been discovered that for an appropriate choice of aluminum and gallium concentrations, the band edge energies of the two bands can be made almost the same. Therefore, two material layers or carrier channels placed adjacent to each other with the $\Gamma$ band minimum energy of one matching the $X$ band minimum energy of the other, allows relatively easy transfer of electrons between the two materials.

FIG. 4 presents a series of graphical representations of examplary layer or channel composition and physical characteristics, including index of refraction, for the structure shown in FIG. 2. In FIG. 4a, the relative aluminum and gallium composition of the material used to form the waveguide structure, $Al_yGa_{1-y}As$, is shown as a function of waveguide depth or thickness, z. At the lower and upper limits of the waveguide where the layers of cladding 32a and 32b reside, the value of y is chosen to be close to 1 so as to provide almost pure AlAs cladding. The doping used to supply free electrons in the structure is illustrated in FIG. 4b.

Figure 4A:
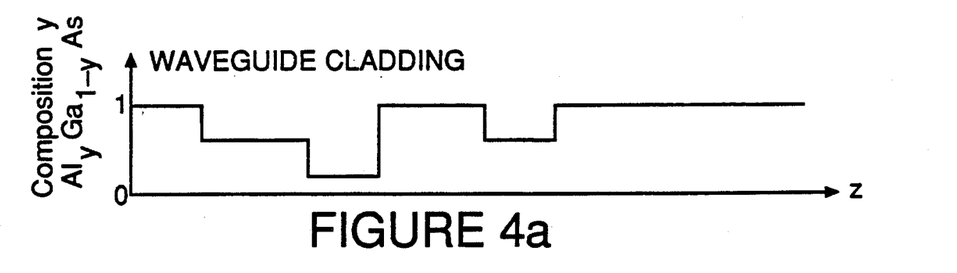
FIGS. 4(a)-(e) illustrates a graphical representation of material concentrations and resulting physical properties for material useful in manufacturing the device of FIG. 1.
Figure 4B:
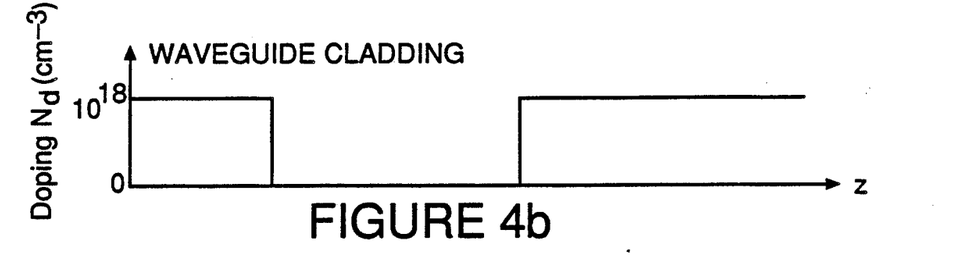
Figure 4C:
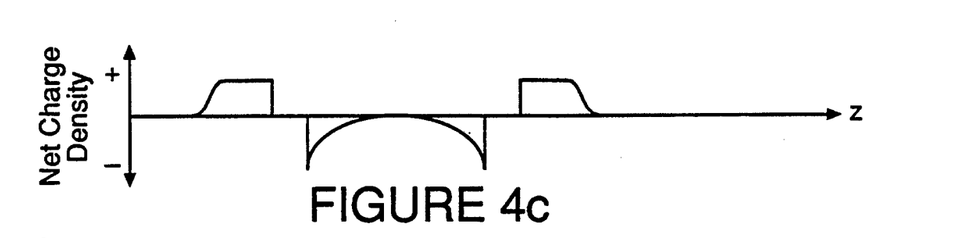
Figure 4D:
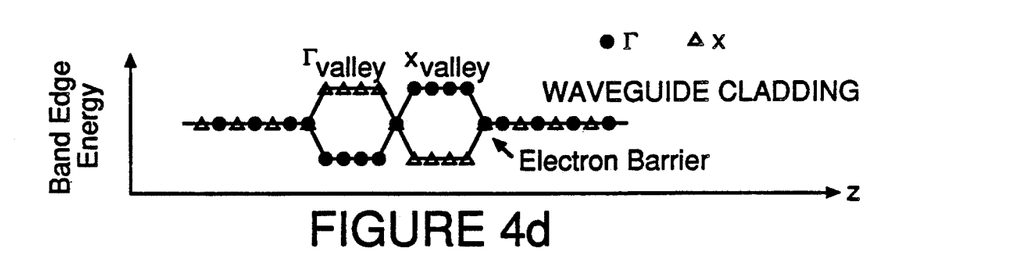
Figure 4E:
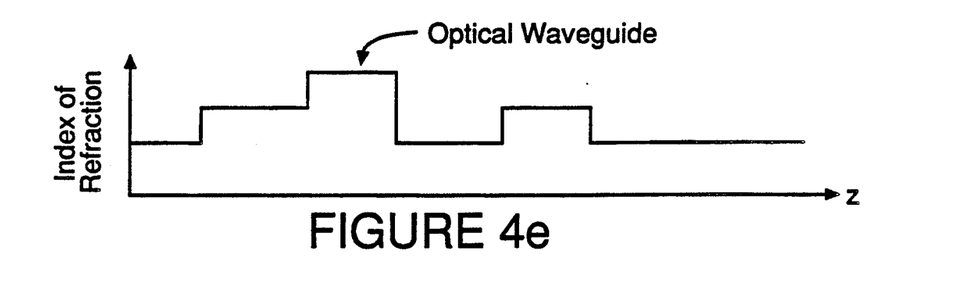

The relative net charge densities resulting from this structure are illustrated in FIG. 4c and the band energies in FIG. 4d. The relative index of refraction at varying layer positions is illustrated in FIG. 4e. The band energy of the electron barriers are shown normalized to a predetermined level for purposes of illustration and to best illustrate the variation in band energy across the material layers at a particular level. Those skilled in the art of semiconductor design will readily understand the techniques for determining the absolute values of the energy levels according to the materials and structural configurations employed.

A small voltage applied across the device contacts 42 and 44 transfers electrons back and forth between the $\Gamma$ and $X$ materials. The electrons residing in the $\Gamma$ material or carrier channel have a much larger impact on the refractive index than the electrons in the $X$ material because their effective mass is much smaller, about an order of magnitude difference. It has been found that the change in refractive index is essentially equal to that expected if all of the electrons were completely removed or moved from one sub-region to the other.

An alternative embodiment which enhances free carrier confinement and, therefore, improves the magnitude of modulation, comprises a series of Multiple Quantum Wells (MQW) of $\Gamma$ and $X$ well material separated by narrow barriers in place of the unitary $\Gamma$ and $X$ material layers. A quantum well transferred effective mass modulator exhibiting lateral mode confinement is illustrated in FIG. 5.

Figure 5:
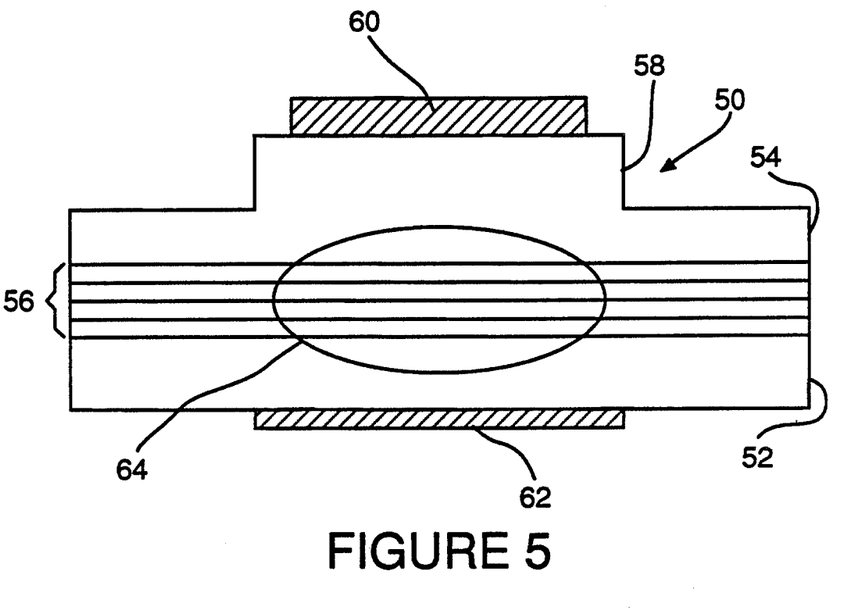
FIG. 5 illustrates a sectional view of a quantum well configuration for the high speed optical modulator of FIG. 1 with improved confinement.

In FIG. 5, a modulator 50 of the ridge waveguide-type is shown using a lower cladding layer 52 on which a series of quantum wells 56 are deposited followed by an upper cladding layer 54 and a ridge layer 58. The quantum wells are formed using techniques known to those skilled in the art. The modulator 50 can be manufactured using an $Al_yGa_{1-y}As$ system as previously discussed. The material used to form the cladding layer 54 is typically deposited the full thickness of layers 54 and 58 and then etched back to leave the ridge 58 to provide lateral confinement of the optical mode. As before, the composition of the cladding material, and ridge layer 58, is adjusted so that its index of refraction is higher than the quantum wells.

A gate metal is deposited on the layer 58 to form an upper electrical contact 60. A lower ohmic contact 62, is formed on the lower surface of the cladding 52 and used as a second electrical contact for establishing an electric field across the quantum well structure 56. An Electro-magnetic Mode (EM) 64 is formed or supported between the contacts in the quantum well region 56 and extends into the adjacent cladding and ridge layers. The mode 64 is used to conduct optical radiation within the waveguide portion of the modulator 50. Applied electric fields transfer electrons within the quantum wells and, thus, alter the index of refraction in the modulator 50. Where desired, an additional conductive substrate layer can be positioned between the contact 62 and the cladding layer 52.

Figure 6:
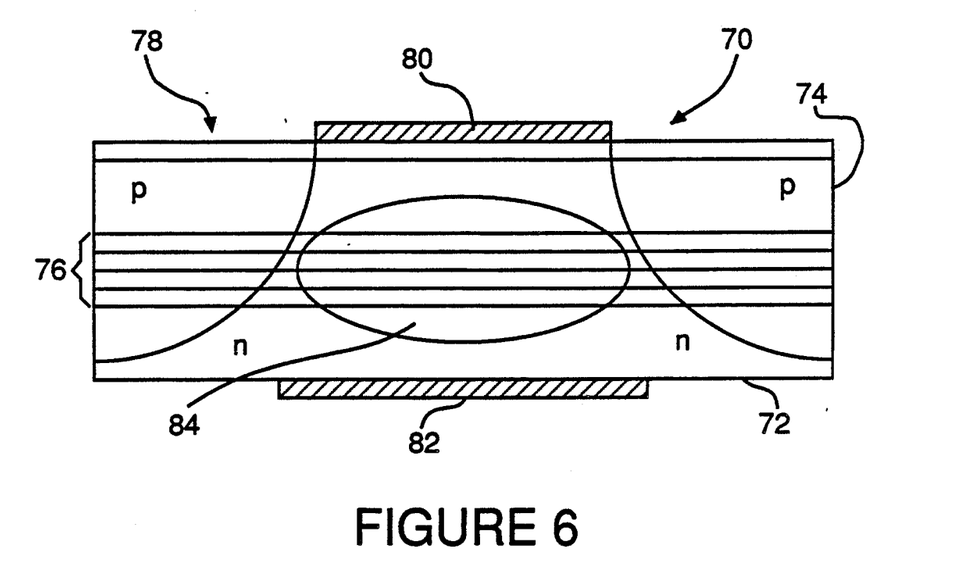
FIG. 6 illustrates a sectional view of a barrier enhanced quantum well configuration for the high speed optical modulator of FIG. 1 with improved confinement.

Alternate methods of horizontal or lateral mode confinement include the use of an oxide stripe or diffusion induced disordering of the quantum well region. An embodiment using diffusion induced disordering is illustrated in FIG. 6. In FIG. 6, a modulator 70 comprises the cladding layers 72 and 74 disposed on either side of associated quantum well layers 76. Upper and lower electrical contacts 80 and 82, respectively, are positioned on the cladding layers 74 and 72. The material layers 72, 74, and 76 are exposed to a diffusion process which alters the structure from a superlattice to a random alloy material in the regions 78. This creates disordering of the quantum well structure which results in a lower index of refraction in the disordered region and produces horizontal confinement. In operation, the modulator 70 confines an electromagnetic mode 84.

A quantum well type modulator structure may decrease device capacitance while providing improved interfacing with similar optical device structures. The low capacitances of the apparatus allows high speed operation from 50 $\Omega$ source impedances. The structural similarities to other MQW type devices, such as lasers, should allow more efficient coupling to such devices or sources. If fabricated as a series of quantum wells, the device exhibits large birefringence allowing use as an electrically adjustable birefringent element. Adjustable birefringent elements can be used for polarization control of TE-TM mode conversion, and development of high-speed, optoelectronic logic functions. Where integrated into a laser cavity, this structure could also provide improved frequency stabilization.

Returning now to FIG. 2, it is estimated that the modulator 30, when constructed according to the patterns of FIG. 4, has very desirable characteristics. With index changes of 0.02 and a mode overlap factor of 0.1, a $\pi$ phase shift is obtained in a device approximately 250 $\mu$m long. The capacitance limited 3 dB bandwidth is about 6 GHz if using a 50 $\Omega$ input impedance and increases with lower input impedance. When used in a traveling-wave configuration, the capacitance of the device no longer limits the switching speed, which is about 50 GHz or greater. The anticipated optical insertion loss is very low, and when used with wavelengths below the bandgap, is estimated to be about 1 dB for anti-reflection coated waveguides constructed with good mode matching to an emitting laser or optical fiber.

Using known values for the number of free carriers that can be obtained in conduction channels for semiconductor devices, and capacitances for desirable feature sizes on the order of 2 μm, an estimate can be made of the index changes possible. Such estimates show index changes of about 0.04 in 25 μm devices using confinement factors of about 0.5. Such a device exhibits π phase shifts with much lower capacitances which lead to RC limited bandwidths on the order of 60 GHz at 50 Ω impedances. Traveling-wave devices have bandwidths which are limited by the propagation velocity matching between the optical and microwave switching signals which is in excess of 100 GHz. Waveguide losses caused by the free carriers would be reduced, providing for insertion losses of around 0.2 dB. The required driver voltage would be around 1-2 volts.

A fill factor, i.e., overlap of the mode with the modulation region, of 0.2–0.3 should be easily obtained. The effective index variation could then be in the range of 0.01–0.001 for this structure ($5 \times 10^{18}$ carriers per $cm^3$).

In order to achieve a phase shift of π at 1.3 μm wavelength, a length of 100 μm would be required according to the expressions:

$$L = \frac{\lambda_{vac}}{2(\Delta n)} = \frac{1.3 \times 10^{-4}}{2(0.007)} \quad 3)$$

Those skilled in the art will readily appreciate that the actual effective index change is dependent upon the overlap of the optical mode and the Γ layer. Optimizing this overlap is familiar to those skilled in the art and confinement factors of 0.1 should be readily achieved. This would translate to an effective index of ~0.002 for an integrated waveguide. It is known that actual index changes are generally higher than those predicted solely from free carrier effects due to other effects that often accompany density changes. The change in free carrier density also changes the absorption edge through band filling and electro-absorption effects. The magnitude of the index change obtainable affects the size of the waveguide device needed, which in turn determines the maximum speed due to transit time for the free carriers. However, the time required for moving free carriers a few hundred Angstroms is very short and reflection of the carriers at the effective mass discontinuity is considered negligible.

The operating wavelength of this invention is limited only by the strong inter-band absorption above bandgap, and intra-band absorption caused by free carriers at very long wavelengths. The transfer of free charge carriers and change in index of refraction operates at extremely fast inherent speeds. In principle, the modulator is only RC limited.

To manufacture the invention, well developed MBE and MOCVD technologies in GaAlAs can be utilized, which allow fine control over crystal properties. The exemplary GaAs-GaAlAs system disclosed above allows potential integration with other high speed devices such as MESFETs, HEMTs, MMFETs, lasers, photodetectors, and waveguides. That is, transferred electron effective mass modulators should be easily integrated onto common substrates with these devices due to similarity in the semiconductor structures and manufacturing techniques.

The structural similarity of this modulator to that of semiconductor lasers allows good mode matching to lasers, which exploits fiber-laser-photodetector technology to a new level. The bandwidth-length product of the invention is also superior to that of $LiNbO_3$ modulators, being on the order of 60 GHz-cm for GaAs relative to 7 GHz-cm for $LiNbO_3$. This improvement allows higher bandwidth traveling-wave modulators and optical switches. The large magnitude of the free carrier effect promises smaller optical devices operating at lower power levels and higher RC limited bandwidths than currently available. The voltages required for operation should be very low which means low power consumption and efficient operation.

Where desired, other doping concentrations or species can be used in the barrier regions to increase the effective height of the barrier, or increase the donor density. The wells contain a high electron density which is transferred to the lower energy wells from the heavily doped barrier layers.

Embedding a depleted p-type region in the barrier provides increased barrier height which could improve room temperature operation. This type of barrier enhancement has been used in the art in a variety of diodes and transistors. Those skilled in the art will readily understand the barrier height required for given applications and AlGaAs concentrations employed for the Γ and X wells, as well as the barrier positions. Increased barrier height also decreases thermionic emission out of the Γ and X channels.

The device of the invention can be exploited in many embodiments that find practical application in the art including, but not limited to, directional couplers and switches. The invention is useful for optical switching, multiplexing, and high speed signal processing, such as in analog to digital conversion.

In further aspects of the present invention, the disclosed structure is easily integrated with one or more photodetectors to achieve extremely fast, optically-switched operation. In this embodiment the photodetector operates as a low-impedance, high-speed driver. This type of modulator interface structure is illustrated in FIG. 7.

Figure 7:
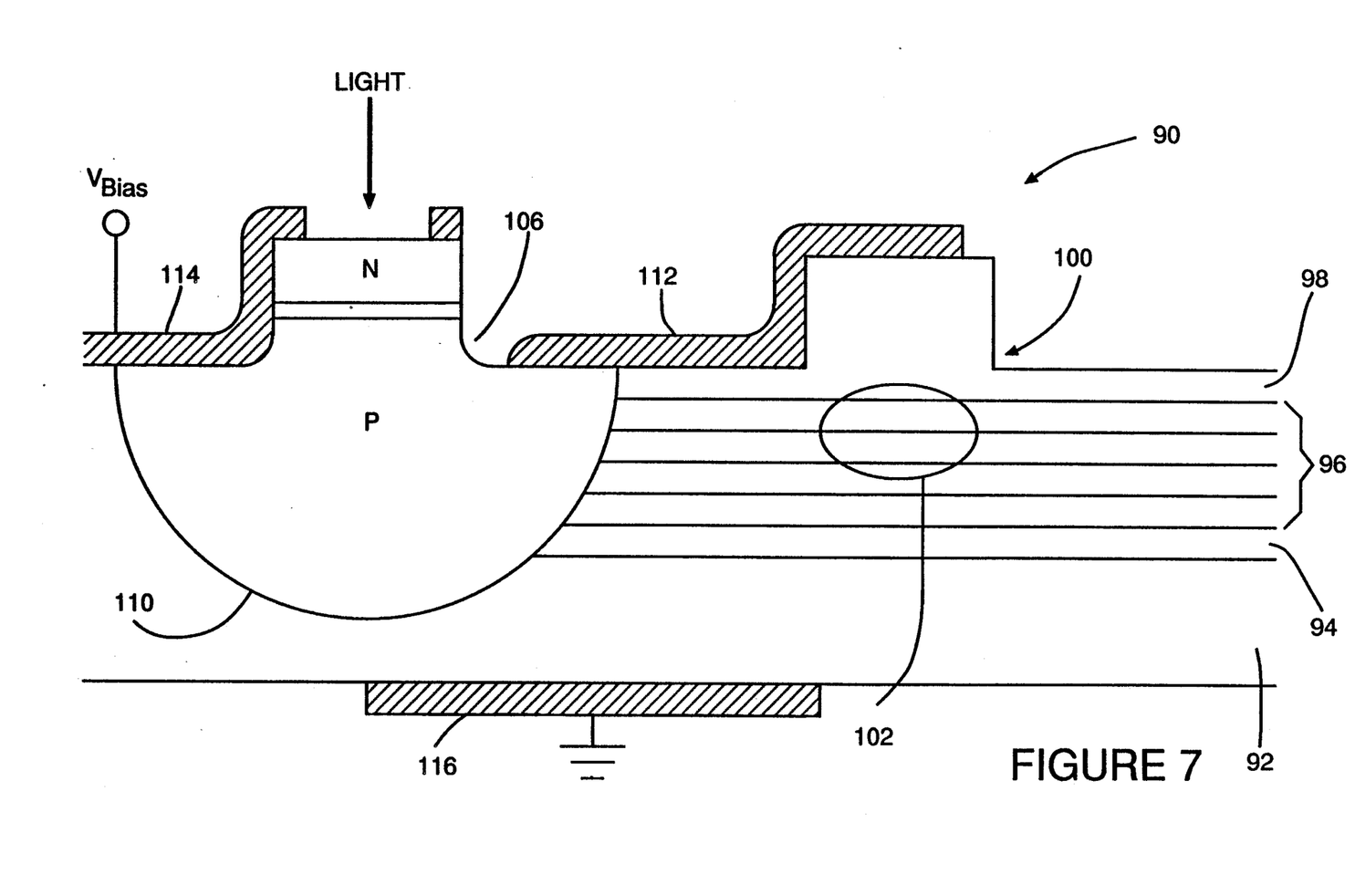
FIG. 7 illustrates a sectional view of a photodetector sensor-type, optically-driven phase modulator constructed according to the principles of the present invention.

In FIG. 7, an optically-controlled optical modulator 90 uses a substrate 92 to support a series of modulator layers adjacent to a photodetector structure 106. For the sake of clarity, no barrier layers are illustrated. The modulator layers comprise a lower cladding layer or material 94, quantum well layers 96, and an upper cladding material or layer 98, which form a waveguide region 100 which supports an electro-magnetic mode 102. Where desired, the upper cladding 98 is configured as a raised ridge to provide lateral confinement of the mode 102 adjacent the upper surface of the modulator 90.

A diffused layer 110 forms a lower portion of a N-P or P-N junction in the photodetector 106, here illustrated as a layer of P-type material, and is electrically connected to the waveguide 100 through an upper waveguide contact 112. The material 100 applies a voltage to the contact metal 112 when excited by conduction through the photodetector 106. A second upper metal contact 114 is provided for biasing the top layers or junction for the photodetector 106. The metal layer 112 is an upper electrical contact for biasing the modulator 90 in conjunction with one or more base contacts 116. It will be readily apparent to those skilled in the art that additional or more complex photodetector structures, protective surface coatings, or optical windows may be employed where desired without departing from the teaching of the present invention.

Optical radiation of the appropriate wavelength impinging on the photodetector 106, alters the voltage or electric field presented by the photodetector 106 to the active region 96 through the upper metal contact layer 112. The voltage change in turn alters the free-carrier distribution and the refractive index of the waveguide region 100. Therefore, optical modulation or intensity variations applied to the photodetector 106 alter the phase modulation applied to the electro-magnetic mode 102 of the waveguide region 100.

Figure 8:
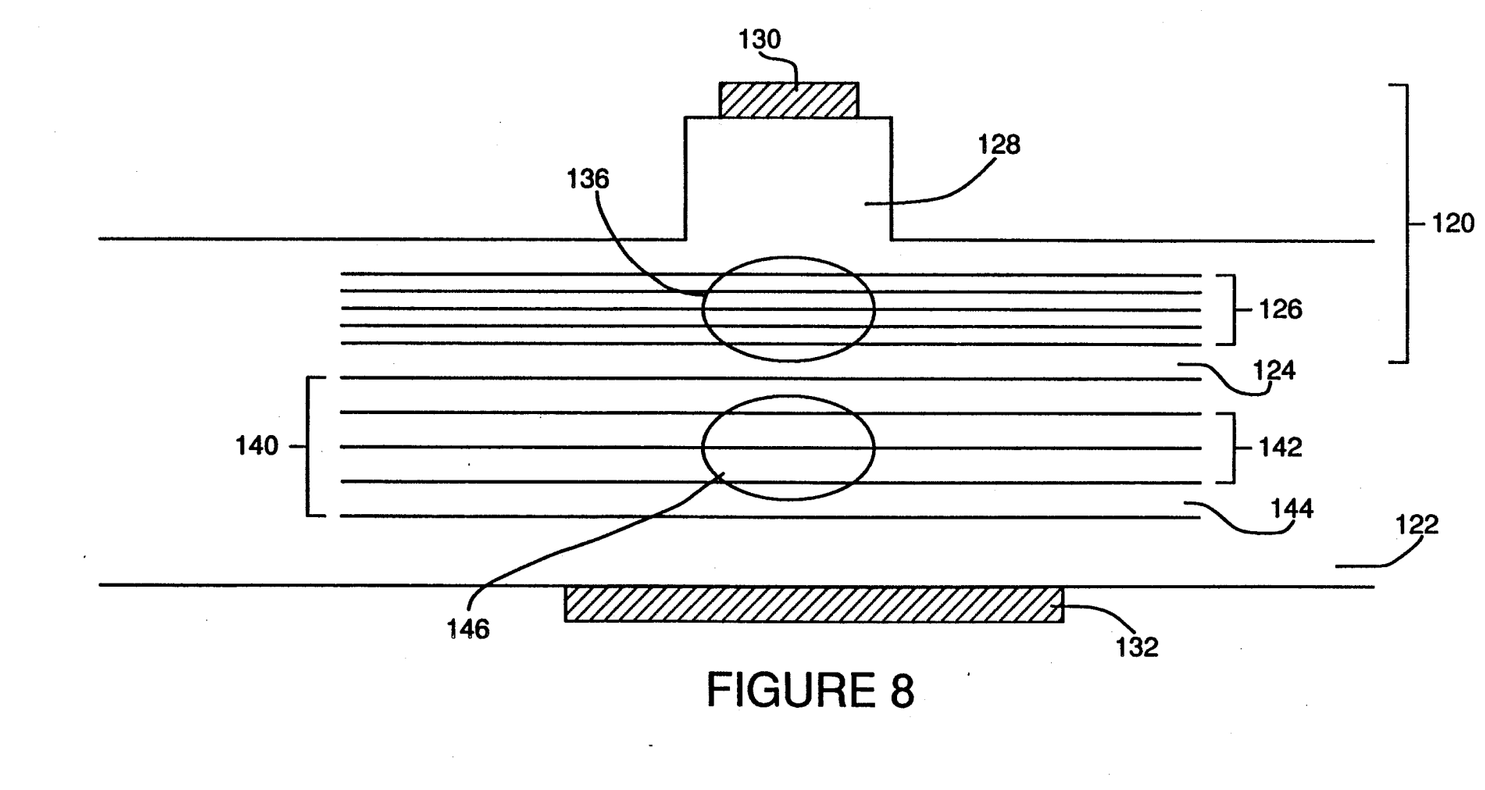
FIG. 8 illustrates a sectional view of a waveguide-type, optically-driven, optically-modulated phase modulator constructed according to the principles of the present invention.

Another embodiment for an integrated optically-controlled modulator is shown in FIG. 8. In FIG. 8, an optical modulator with a waveguide region 120 is constructed, as previously disclosed, using $\Gamma$ and X band-type materials on a substrate 122 form quantum wells 126 between lower and upper cladding layers 124 and 128, respectively. Upper and lower biasing contacts 130 and 132 are provided for electrically biasing the quantum well region with a predetermined voltage. An electro-magnetic mode 136 is supported in the waveguide region 120 and modulated by modulating the applied electric fields.

Positioned adjacent to the waveguide region 120 is a second waveguide region 140, which is embedded in photo absorptive material or layers 142 which are also formed on top of the substrate 122. A separate cladding layer 144 is used to complete the waveguide region 140. In some applications, the cladding layer 124 may be omitted or the cladding 144 formed by the substrate 122, depending upon the wavelengths of optical radiation being transferred and confined in the optical modes, and the materials being used, as will be clear to those skilled in the art.

The waveguide region 140 generally supports an electro-magnetic mode 146 through which "control" or "modulating" optical radiation is transferred. Changes in the intensity of optical radiation in the waveguide 140 result in corresponding changes in the electrical conductivity of the waveguide region 140 through changing optical absorption in the layers 142. Changes in the material conductivity of the waveguide region 140 alter the electric field being applied across the waveguide region 130 by the bias contacts 130 and 132. Changes in bias voltage applied to the waveguide 120, alter the position of free carriers which in turn alters the phase of transmitted or transferred optical radiation in the waveguide 120. This arrangement, in which the modulator layer is placed on the photodetection layer, or vice versa, allows one optical beam to phase modulate another. There are many variations that could be used for transverse mode confinement or other details of design.

What has been described is a new high-speed, optical modulator capable of being manufactured with well-developed technology. The optical modulator addresses several application needs and can be readily interfaced to a variety of optical devices or incorporated in hybrid optical device structures.

The foregoing description of preferred embodiments has been presented for purposes of illustration and description. It is not intended to be exhaustive nor to limit the invention to the precise forms disclosed, and many modifications and variations are possible in light of the above teaching. Examples include the addition of other cladding layers, or the omission of cladding layers where the modulator channels are incorporated in a larger optical structure providing vertical channel confinement. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What we claim as our invention is:

1. An optical radiation modulator having a waveguide region with an alterable index of refraction over a predefined range disposed adjacent to lower refractive index cladding, the waveguide region comprising:
   a first doped region of a semiconductor material having a first effective mass for free charge carriers at a predefined band edge energy, said first region being doped to provide at least one conduction band with a first minimum band edge energy;
   a second doped region of said semiconductor material positioned immediately adjacent to said first doped region and having a second effective mass for said free charge carriers at said predefined band edge energy, said second region being doped at a different concentration from said first doped region so as to have at least a second conduction band with a minimum band edge energy substantially the same as said first minimum band edge energy;
   third and fourth regions of barrier material disposed adjacent said first and second regions, respectively, so as to restrict transfer of free carriers outside of said first and second doped regions; and
   means for moving charge carriers between said first and second regions.

2. The optical modulator of claim 1 wherein said semiconductor material comprises $Al_yGa_{1-y}As$, the value of y for said first region is a predetermined number different than for said second region, and y is adjusted so that the band edge energy of a direct band in one region is about the same as the band edge energy of an indirect band in the other region.

3. The optical modulator of claim 1 wherein said means for moving charge carriers comprises at least two electrodes disposed on opposite sides of said waveguide region and connected to means for generating an electrical voltage.

4. The optical modulator of claim 1 wherein said barrier material further comprises cladding material so as to provide optical confinement.

5. The optical modulator of claim 1 further comprising cladding material disposed about said barrier material so as to provide optical confinement.

6. The optical modulator of claim 5 wherein said means for moving charge carriers comprises doping said cladding to provide a conductive material disposed on opposite sides of said waveguide region being further connected to means for generating an electrical potential therebetween.

7. The optical modulator of claim 5 wherein said waveguide comprises a planar waveguide and said first and second optically transmissive materials, barrier material, and cladding are manufactured as planar layers.

8. The modulator of claim 7 wherein an upper cladding layer is applied in the configuration of a ridge.

9. The optical modulator of claim 7 wherein said first and second materials are deposited as a series of quantum well layers.

10. The optical modulator of claim 9 wherein said quantum wells comprise superlattice structures deposited in a graded configuration.

11. The optical modulator of claim 9 further comprising at least first and second regions of disorder within said quantum well layers on opposite sides of a desired optical path whereby horizontal optical confinement is achieved.

12. The modulator of claim 11 wherein said regions of disorder comprise regions of material doping.

13. The modulator of claim 7 further comprising first and second biasing contacts disposed on upper and lower surfaces of said planar waveguide.

14. The modulator of claim 13 further comprising a photodetector positioned adjacent said waveguide region and having an electrical output connected to one of said biasing contacts.

15. The optical radiation modulator of claim 13 further comprising:
   electro-absorptive material disposed between said cladding and said waveguide region; and
   an optical control waveguide formed in said electro-absorptive material.

16. The modulator of claim 1 further comprising a photodetector positioned adjacent said waveguide region and having an electrical output connected to provide a voltage potential across said first and second regions of said semiconductor material.

17. The optical radiation modulator of claim 1 further comprising:
   electro-absorptive material disposed adjacent said barrier material of said waveguide region; and
   an optical control waveguide formed in said electro-absorptive material.

18. The optical modulator of claim 1 wherein said first and second material layers comprise first and second doped regions, respectively, of a common semiconductor material positioned immediately adjacent to each other with said first region being doped to provide at least one conduction band with a first minimum band edge energy and said second region being doped at a different concentration so as to have at least a second conduction band with a minimum band edge energy substantially the same as said first minimum band edge energy.

* * * * *